Feb. 26, 1963 — L. F. GILBERT — 3,078,723
CONTROL APPARATUS
Filed March 24, 1960 — 2 Sheets-Sheet 1

INVENTOR.
LYMAN F. GILBERT
BY
ATTORNEY

United States Patent Office 3,078,723
Patented Feb. 26, 1963

3,078,723
CONTROL APPARATUS
Lyman F. Gilbert, Lyndhurst, Ohio, assignor to Bailey Meter Company, a corporation of Delaware
Filed Mar. 24, 1960, Ser. No. 17,307
8 Claims. (Cl. 73—507)

This invention relates to control apparatus and more particularly to a device for measuring and manifesting the speed of rotation of a rotating part.

Heretofore, tachometers and other similar devices have been used to measure the speed of rotating shafts and other parts. As is well known to those skilled in the art however such measuring equipment is generally inaccurate or accurate only in a narrow limited range of high rotational velocities.

One major reason for the inaccuracies in present equipment is the fact that the mechanisms or systems employed are essentially of the "open loop" type wherein the manifestation of velocity is subject to errors due to changing friction and characteristics of components such as electric motors, bearings, etc. Also detrimental to an accurate manifestation in an open loop system is the various non-linearities introduced due to centrifugal and gravitational effects.

It is a principal object of my invention to accurately manifest the speed of rotation of a rotating part.

Another object of my invention is to provide a closed loop null balance servo system for measuring the velocity of a rotating part.

Still another object of my invention is to provide a tachometer capable of producing accurate manifestations of very slow rotational velocities.

And a further object of the invention is to produce a signal for indicating and/or control purposes representative of the speed of rotation of a rotating part.

Other objects and advantages will become apparent from the following description taken in connection with the accompanying drawing wherein.

Figure 1:
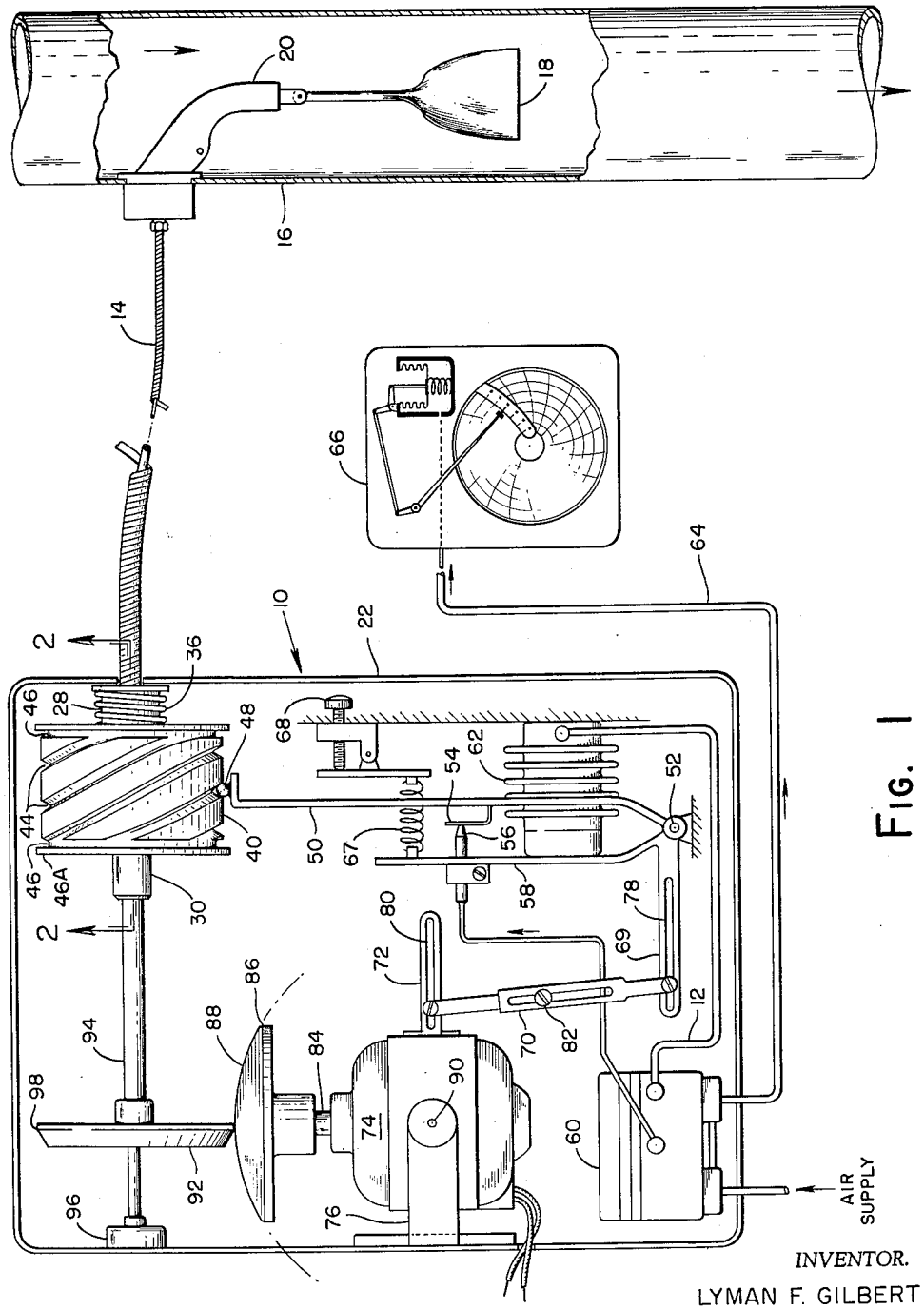
FIG. 1 is a schematic illustration of a tachometer measuring device embodying the invention.

Referring more particularly to FIG. 1 of the drawings, there is shown a tachometer measuring device 10 which in general is effective to produce a pneumatic pressure signal in tubes 12 and 64 representative of the rotational velocity of a flexible shaft 14. In the application illustrated the measuring device 10 is utilized to manifest the flow rate of a fluid solid such as coal through a conduit 16. A primary measuring element comprising a vane 18 is mounted in the conduit 16 to be rotated by the fluid solid and is operative to impart rotational movement to the shaft 14 through suitable bearings and gearing (not shown) in supporting housing 20. For a complete disclosure of the structure and operation of such a fluid solid flow detecting means reference is made to my copending application Serial No. 854,916, filed on November 23, 1959, now Patent No. 3,064,475.

Figure 2:
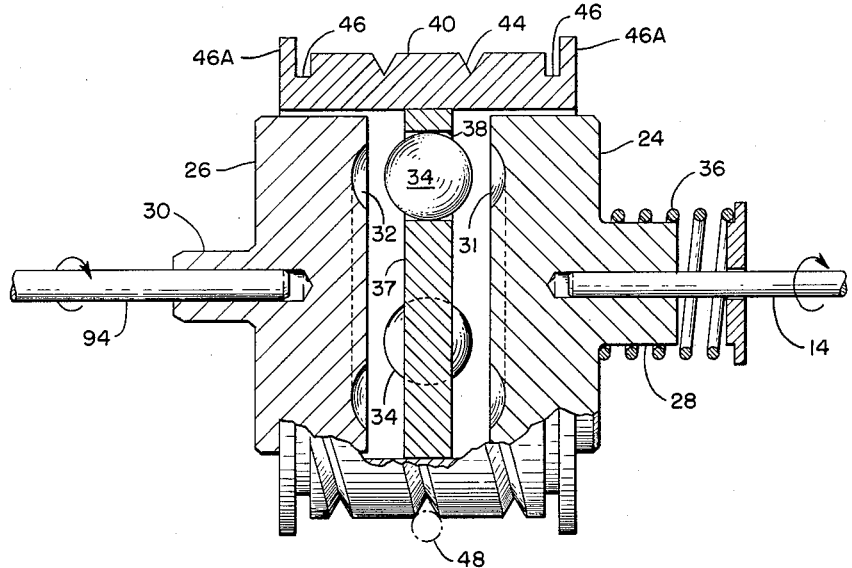
FIG. 2 is an expanded section to larger size taken along the line 2—2 of FIG. 1.

Referring now in detail to the present invention, the device 10 is illustrated as disposed in a housing or casing 22 of generally rectangular configuration. A pair of axially aligned rotatable discs 24 and 26 (FIG. 2) are independently rotatably mounted in the upper portion of the casing 22 and positioned in spaced parallel relationship. The discs 24 and 26 are provided with oppositely extending hubs 28 and 30 respectively supported in suitable bearings (not shown).

The discs 24 and 26 are provided with complemental annular grooves or raceways 31 and 32 respectively which are engaged by a plurality (in this case three) of spaced balls 34. A biasing spring 36 serves to bias the discs into engagement with the balls 34 and retain the balls 34 in the raceways of the discs 24 and 26.

A retaining disc 37 is provided with a plurality of spaced bores 38 which receive the balls 34 to maintain their circumferential spacing. A cylindrical cam 40 is secured to the periphery of the retaining disc 37 and encloses the assembly of the discs 24 and 26, disc 37 and balls 34. The flexible shaft 14 is connected to the hub 28 of disc 24 to effect rotation of the disc 24 at a velocity proportional to the speed of rotation of vane 18.

Disc 26 as will later be described is maintained at the same rotational velocity but in opposite direction as disc 24 by a variable speed drive to establish a null balance. If the velocities of the two discs are equal but opposite the balls 34 and retaining disc 37 will be stationary, the balls merely rotating about their centers in their associated bores. If the speed of the disc 24 should change however due to a change in the flow rate of the fluid solid in conduit 16, the retaining disc 37, cam 40 and balls 34 will rotate as a unit clockwise or counterclockwise depending upon whether the speed of disc 24 increased or decreased and at a speed proportional to the change in speed thereof. The displacement of the retaining disc 37 and cam 40 is transduced into a pneumatic signal which is utilized to vary the speed of disc 26 until the two velocities are again equal but of opposite direction. Thus, a closed loop system is established wherein a feedback angular velocity is balanced against an input velocity to establish a null condition.

Referring now to the transducing means, the periphery of the cam 40 is provided with a plurality of parallel V-grooves 44 cut at a predetermined pitch relative to the axis of the cam and provided with connecting peripheral end square grooves 46.

The grooves 44 and 46 are adapted to be engaged by a ball follower 48 fixed to one end of a lever 50 pivoted at 52. A baffle is mounted on the lever 52 for movement relative to a nozzle 56 carried by a lever 58 also pivoted at 52 independentdly of lever 50. The nozzle 56 and baffle 54 form a nozzle baffle fluid pressure couple. A pneumatic amplifier 60, which may be of the type disclosed in copending U.S. application Serial No. 652,477 filed on April 12, 1957 by Bruce H. Baldridge now Patent No. 2,974,674, is responsive to variations in the pressure in nozzle 56 produced by change in the couple spacing to establish the pneumatic output pressure signal in tube 12. The output pressure signal in tube 12 is supplied to an expansible bellows 62 engaging the lever 58 to effect a null balance that will presently be described. The same output pressure as in tube 12 is transmitted by tube 64 to a recording device 66 which produces a manifestation of the flow rate in conduit 16 and a continuous record thereof. As will be apparent to those skilled in the art the output pressure in tube 64 may be utilized for control as well as exhibiting purposes. Thus in my copending application Serial No. 14,009, filed in the United States Patent Office on March 10, 1960, now Patent No. 3,043,525, I show an arrangement wherein the output pressure is used in a control system for a pulverizer.

The lever 58 is provided with an arm 69 which is connected by an adjustable link 70 to a lever 72 extending from an electric motor 74 pivotally mounted at 90 on stationary bracket 76. Suitable pins at opposite ends of the link 70 are adjustably clamped in elongated slots 78 and 80 formed in the arm 69 and lever 72 respectively. The length of link 70 is adjustable by means of a clamping screw 82.

The motor 74 is provided with a drive shaft 84 on which is mounted a drive disc 86 having a spherical surface 88, the center of curvature of which is the pivot point 90 for the motor 76. A driven wheel 92 is mounted on a shaft 94 extending from the hub 30 and having one end mounted in a bearing 96. The outer edge of the wheel 92 is bevelled as at 98 and engages the spherical face 88 of the disc 86.

The motor 74 is effective through drive disc 86 to rotate the disc 92, shaft 94 and disc 26 at a variable speed the magnitude of which at any instant depends on the angular position of motor 74. In the position shown the bevelled edge 98 engages the spherical surface 88 at the geometric center thereof, and the velocity of disc 92 will be zero. However, pivotal movement of motor 74 in a clockwise direction under the influence of bellows 62 will shift the point of contact from the center of surface 88 toward the periphery thereof providing a rotational velocity in one direction of disc 92 proportional to the radial distance of the point of contact from the center. Thus, the rotational velocity of discs 92 and 26 at any instant is proportional to the angular position of motor 74. Pivotal movement of motor 74 in a counterclockwise direction causes a rotational velocity in opposite direction of disc 92 proportional to the radial distance of the point of contact of disc 92 from the center of drive disc 86.

In operation assume that the discs 24 and 26 are rotating in opposite directions at equal velocities. At this condition the cam 40 will be at rest, the balls 34 merely rotating about their centers in bores 38.

If the flow rate of fluid solid in conduit 16 should change, a coresponding change in the rotational velocity of shaft 14 and disc 24 will occur. Under this condition angular displacement of cam 40 will occur at a velocity equal to the difference in rotational velocities of the discs 24 and 26 and in a direction depending upon whether the velocity of shaft 14 increased or decreased. Such angular displacement of the cam 40 will effect pivotal displacement of the lever arm 50 causing a change in the spacing between nozzle 56 and baffle 54 to modulate the nozzle pressure. The pneumatic amplifier 60 will respond to the altered nozzle pressure to produce an amplified signal pressure in tubes 12 and 64.

The bellows 62 will adjust in response to the changes in pressure in tube 12 to position lever arm 58 and effect pivotal movement of the motor 74. Pivotal movement of motor 74 wgill shift the point of engagement of wheel 92 with the driving disc 86 to thereby adjust the speed of shaft 94 until it is equal and opposite to that of shaft 14, when cam 40 is stationary and the original spacing between baffle 54 and nozzle 56 is restored. Thus, in response to a change in an input velocity the system functions to produce an equal change in a feedback velocity but in opposite direction to establish a null condition and a change in output pressure signal directly proportional to the change in input velocity.

The periphery of cam 40 is provided with a plurality of V-grooves 44 so that if an extreme or rapid variation in velocity of disc 24 should occur causing the follower 48 to move into one of the end grooves 46 before the balancing velocity can be established, the follower 48 may engage any one of the grooves 44 when the balancing action subsequently occurs to return to its normal null position in minimum time. The square end grooves 46 cooperate with the guard rings shown at 46A to urge the follower into each groove as it passes by. Such construction is particularly advantageous on suppressed ranges with the device adjusted to produce full range output of the pressure in tubes 12 and 64 for a relatively small change in speed of shaft 14.

To emphasize the universal application of my invention I have shown the ball follower 48 in the center of cam 40 with the driven wheel 92 engaging the center of drive disc 86. These are the relative positions of these elements with no flow through the conduit 16, i.e. with shafts 14 and 94 at rest. Flows in one direction through the conduit 16 will effect a positioning of drive disc 86 relative to driven wheel 92 always in a predetermined sense from this center. That is to say the point of engagement of drive disc 86 and driven wheel 92 will always be on one side of the center of drive disc 86 so long as flow through conduit 16 is in one direction. It is apparent therefore that the device is arranged to measure reverse flows as illustrated in FIG. 1, as the mechanism may be adjusted to produce an output of amplifier 60 of say 15 p.s.i. at no flow. Thereafter this output pressure will decrease proportionately to increase in flows through conduit 16 in one direction and increase proportionately to increase in flows through conduit 16 in opposite direction. Obviously the vane 18 in the form illustrated is not suitable for such operation, however, as will be apparent to those skilled in the art, my invention may be used with primary elements such as turbine and positive displacement meters which are adapted to the measurement of fluid flows in reverse directions.

In the alternative, to increase the travel of ball follower 48 relative to cam 40; arm 69, link 70 and arm 72 may be adjusted so that with no flow through conduit 16, the ball follower 48 is at an end groove 46 and the output of amplifier 60 is at minimum value. Thereafter, increases in flow will cause proportionate movements of ball follower 48 across cam 40 and proportionate increases in output of amplifier 60. At some rate of flow through conduit 16 the ball follower 48 will engage the opposite end groove 46 and it may be said that the maximum rate of flow which the device can respond to has been reached. This maximum value may be changed to suit the device to the conditions of any particular installation through adjustment of arm 69, link 70 and lever arm 72 to vary the ratio between displacements of levers 50 and 58 for a given change in speed of shafts 14 and 94.

Figure 3:
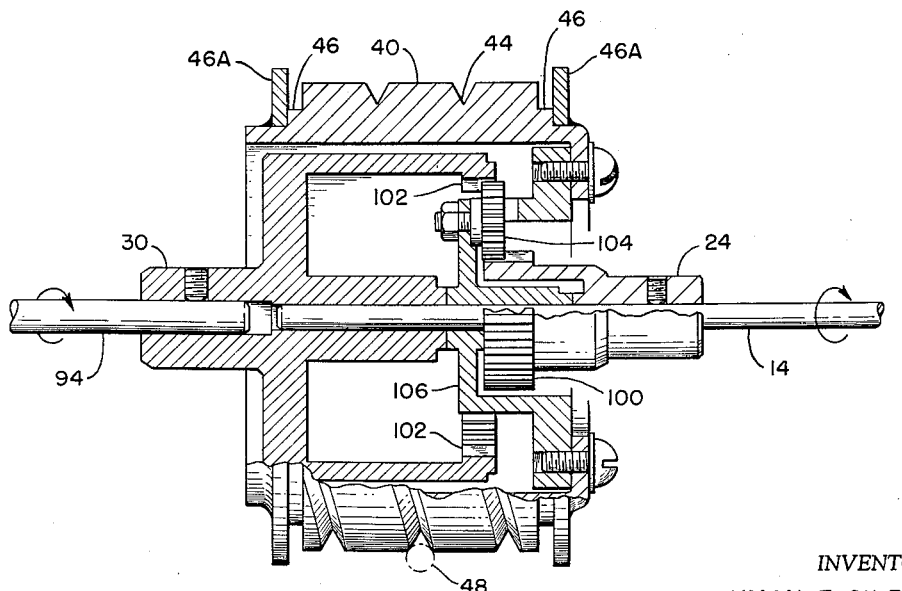
FIG. 3 illustrates, in section, an alternate form of differential mechanism.

In FIG. 3 I show an alternate form of differential mechanism which it is advantageous to use in those applications where preferably a ratio of other than one to one is desirable between the speed of input shaft 14 and feedback shaft 94. Thus where the shaft 14 rotates at a relatively high speed it may be desirable to have the feedback shaft rotate at one half, one third this speed, or other desired speed ratio.

Referring to FIG. 3 I therein show the input shaft 14 arranged to rotate a drive gear 100; and feedback shaft 94, a ring gear 102. Engaging both gears 100 and 102 is an idler gear 104 journaled in a spider 106 to which is secured cam 40. The speed ratio between input shaft 14 and feedback shaft 94 at which the cam 40 remains stationary may be changed by changing the ratio between the gears 100 and 102. With the modification shown in FIG. 3 cam 40 will remain stationary when the speed of feedback shaft 94 is in predetermined ratio to the speed of input shaft 14, rotation of the shafts being in opposite directions. Rotation of the cam 40 will occur as the ratio of speeds of shafts 14 and 94 deviates from this predetermined ratio. The direction of rotation of cam 40 occurs in one direction if this ratio increases and in the other direction if this ratio decreases. As explained in reference to the embodiment of my invention shown in FIG. 1, the speed of shaft 94 is adjusted to restore the predetermined ratio with the speed of shaft 147 after departure therefrom, the displacement of ball follower 48 and lever 50 from an original position then being a measure of the change in speed of input shaft 14.

The null balance closed loop system employed results in an extremely accurate manifestation of a rotational velocity and possesses advantages over prior art tachometers and devices of this nature. One of the most apparent advantages is the fact that the output pressure signal is not affected by variations in characteristics of components within the closed loop.

It will be apparent that the measuring device herein disclosed is not limited to detection of velocities in any particular range but may be adapted to the measurement of extremely low velocities or to the measurements of higher rotational velocities. Conversion from one range of speeds to another may be easily accomplished by substituting motors of different r.p.m. ratings or by providing reduction gearing at the input shaft or in association with the shaft 94.

What I claim as new and desire to obtain by Letters Patent in the United States is:

1. In a measuring device for producing a signal representative of a variable rotational velocity, the combination comprising, a first rotatable part having a variable rotational velocity proportional to the magnitude of a variable, a second rotatable part having a variable rotational velocity, means for varying the velocity of said second part, a nozzle-baffle fluid pressure couple adapted to establish a variable pneumatic signal proportional to the spacing between said nozzle and baffle, means responsive to the difference in rotational velocities of said first and second parts including a cam rotatable at a velocity proportional to the velocity difference, means operatively associated with said cam for actuating said fluid pressure couple to vary said signal, means for amplifying said signal to produce an amplified output signal, and pressure responsive means responsive to said output signal for actuating said velocity varying means to equalize the velocities of said first and second parts.

2. In a measuring device, the combination comprising a pair of rotatable discs having adjacent raceways, a plurality of balls positioned between said discs engaging said raceways, a retaining disc for said balls rotatable therewith according to the rotational velocity difference of said discs, means responsive to a variable for rotating one of said discs at a velocity proportional to the magnitude of a variable, a shaft extending from the other of said discs, a wheel mounted on said shaft, a driving disc having a face surface engaged by said wheel, an electric motor connected to said driving disc for rotating the same, a linkage for displacing said driving disc relative to said wheel to position said wheel relative to the center of rotation to said driving disc to vary the rotational velocity of said other disc, means responsive to movement of said retaining disc for establishing a signal, means for amplifying said signal to produce an amplified output signal, and means responsive to said output signal for actuating said linkage to vary the angular velocity of said other disc to equalize the velocities of said first and said other discs.

3. A measuring device as claimed in claim 2 wherein said movement responsive means comprises a nozzle-baffle fluid pressure couple, and said amplifying means comprising cam means for varying the couple spacing in response to movement of said retaining disc to vary the nozzle pressure, and a pneumatic amplifier responsive to said nozzle pressure to establish a pneumatic output signal.

4. A measuring device as claimed in claim 3 wherein said output signal responsive means comprises an expansible bellows operatively connected to said linkage.

5. A measuring device as claimed in claim 3 wherein said cam means comprises a sleeve mounted on the periphery of said retaining disc and having a peripheral groove of predetermined pitch, and a lever arm pivotally mounted at one end and having the other end engaging said groove, said baffle being mounted on the medial portion of said lever arm for movement relative to said nozzle upon displacement of said lever arm.

6. A measuring device as claimed in claim 2 wherein said face surface is of spherical configuration, said motor and driving disc being pivotally supported as a unit at the center of curvature of said driving disc.

7. In a measuring device for producing a signal representative of a variable rotational velocity the combination comprising, a first rotatable part having a variable rotational velocity proportional to the magnitude of a variable, a second rotatable part having a variable rotational velocity, means for varying the velocity of said second part, balanceable means operative to become unbalanced in response to a difference in rotational velocities of said first and second parts caused by a change in magnitude of the variable to establish a signal representative of the velocity difference, means for amplifying said signal to produce an amplified output signal, and means responsive to said amplified output signal for rebalancing said balanceable means and for actuating said velocity varying means to equalize the rotational velocities of said first and second parts by varying the velocity of said second part, said first and second parts, said velocity varying means, said balanceable means, said amplifying means, said rebalancing and actuating means forming a null balance closed loop system thereby rendering said amplified output signal substantially independent of variations in characteristics of said means forming said closed loop system.

8. In a measuring device for producing a signal representative of a variable rotational velocity the combination comprising, a pair of rotatable discs having adjacent raceways, a plurality of balls positioned between said discs engaging said raceways, a retaining disc for said balls rotatable therewith according to the rotational velocity difference of said discs, means for rotating one of said discs at a variable velocity proportional to the magnitude of a variable, means for rotating the other of said discs at a variable velocity, balanceable means operative to become unbalanced in response to a difference in rotational velocities of said discs caused by a change in the magnitude of the variable to establish a signal representative of the velocity difference, means for amplifying said signal to produce an amplified output signal, and means responsive to said amplified output signal for rebalancing said balanceable means and for actuating said rotating means for said other disc to vary the rotational velocity thereof and thereby equalize the rotational velocities of said discs, said discs, said rotating means, said balanceable means, said amplifying means, and said rebalancing and actuating means forming a null balance closed loop system to render said amplified output signal substantially independent of variations in characteristics of said means forming said null balance closed loop system.

References Cited in the file of this patent

UNITED STATES PATENTS

| | | |
|---|---|---|
| 1,644,167 | Best | Oct. 4, 1927 |
| 1,994,330 | Winkley | Mar. 12, 1935 |
| 2,142,951 | Mead | Jan. 3, 1939 |
| 2,160,324 | Berges | May 30, 1939 |
| 2,476,269 | Blackman | July 19, 1949 |
| 2,595,195 | Hosterman | Apr. 29, 1952 |
| 2,779,582 | Hopper | Jan. 29, 1957 |
| 2,861,638 | Grosselfinger et al. | Nov. 25, 1958 |
| 2,935,311 | Kabelitz | May 3, 1960 |

FOREIGN PATENTS

| | | |
|---|---|---|
| 805,119 | France | Aug. 17, 1936 |
| 146,923 | Germany | Dec. 30, 1903 |
| 299,421 | Germany | July 14, 1917 |
| 211,135 | Switzerland | Aug. 31, 1940 |